May 19, 1931.    I. E. ROGERS ET AL    1,805,498
CLUTCH MECHANISM FOR LOOMS AND THE LIKE
Filed July 8, 1927

Inventors:
Ira E. Rogers,
William C. Scott
by
Their Attorney.

Patented May 19, 1931

1,805,498

UNITED STATES PATENT OFFICE

IRA E. ROGERS, OF MARBLEHEAD, AND WILLIAM C. SCOTT, OF QUINCY, MASSACHUSETTS, ASSIGNORS TO GENERAL ELECTRIC COMPANY, A CORPORATION OF NEW YORK

CLUTCH MECHANISM FOR LOOMS AND THE LIKE

Application filed July 8, 1927. Serial No. 204,381.

The present invention relates to clutch mechanisms wherein one of the clutch elements or members is in the form of a gear wheel which is moved relatively to the other clutch element or member in engaging and disengaging the clutch. Such a combination is found, for example, in connection with electric motor drives for looms. In such drives, the motor has a pinion on its shaft which meshes with a driving gear wheel. The driving gear wheel is loose on the shaft and is provided with a clutch surface adapted to engage the clutch surface of a clutch disk which is fixed on the shaft. Connected with the gear wheel is a mechanism including an arm for moving the gear wheel axially along the shaft to bring its clutch surface into engagement with the clutch surface of the clutch disk and for holding it there. This is termed a shipping mechanism and as is understood in connection with looms, its purpose is to effect release of the clutch upon the occurrence of certain abnormal operating conditions in the loom.

In connection with the operation of a loom, it is important when the shipping mechanism operates that the clutch should release instantly so as to stop quickly the loom as otherwise serious trouble may result, and the object of our invention as applied to a loom is to provide an improved construction and arrangement whereby when the shipping mechanism of a motor-driven loom operates, the clutch will be released instantly.

For a consideration of what we believe to be novel and our invention, attention is directed to the accompanying description and the claims appended thereto.

Figure 1:
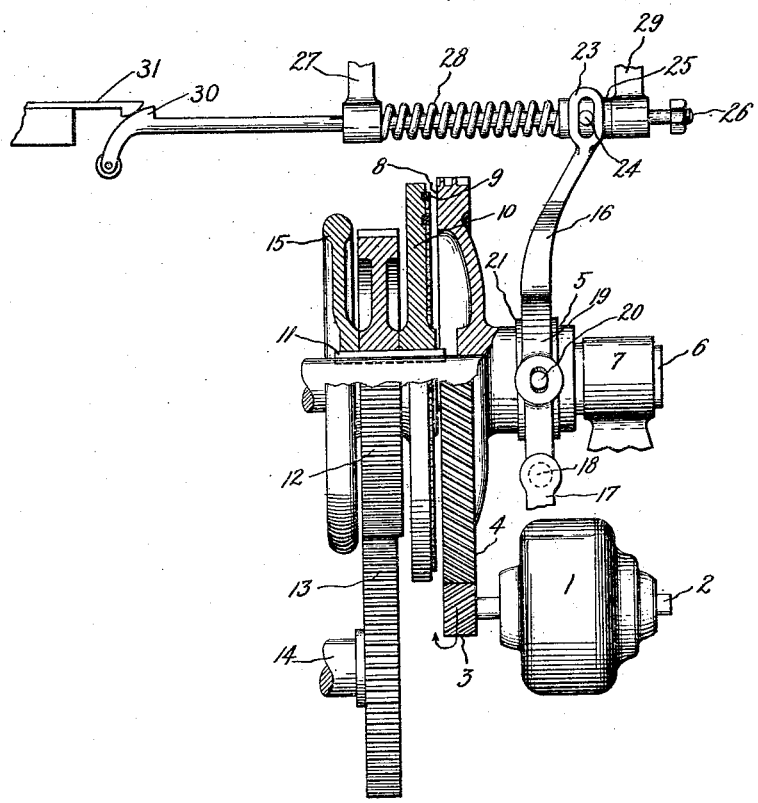
Figure 2:
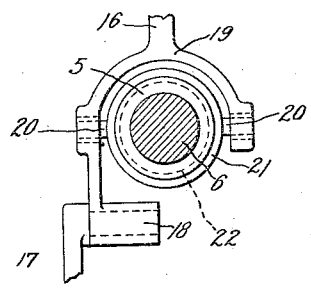

In the drawings, Fig. 1 is a view partly in section of a structure embodying our invention, and Fig. 2 is a detail view.

Referring to the drawings, 1 indicates an electric motor having a shaft 2 upon one end of which is located a pinion 3. Pinion 3 meshes with a gear wheel 4 having a hub 5 loosely mounted on a shaft 6. 7 indicates one of the bearings for shaft 6. Gear wheel 4 is provided with a flat surface 8 which forms a clutch surface and is adapted to engage with a clutch facing 9 on the surface of a clutch disk 10. Clutch facing 9 may be in the form of a number of round inserts such as corks, for example. Clutch disk 10 is fixed on shaft 6 by means of a key 11. Fixed on shaft 6 is a gear wheel 12 which meshes with a gear wheel 13 mounted on a driven shaft 14. 15 is a hand wheel fixed to shaft 6 and gear wheel 12 by means of which shaft 6 may be turned by hand.

With the above-described arrangement when gear wheel 4 has its clutch surface 8 in engagement with clutch facing 9, shaft 6 is driven by motor 1. However, when clutch facing 8 is separated from clutch disk 10, as is shown in Fig. 1 of the drawing, motor 1 drives gear wheel 4 idly on shaft 6. Gear wheel 4 is adapted to be moved to bring its clutch surface 8 into engagement with the facing 9 on clutch disk 10 by means of a lever 16 which is pivoted on a fixed support 17, as is indicated at 18, and is provided with a yoke 19 which engages trunnions 20 on opposite sides of a collar 21 which collar is mounted in a groove 22 in hub 5, the arrangement being such that the hub turns on the collar. The other end of lever 16 is provided with an eye 23 which engages a pin 24 projecting from a sleeve 25 on a rod 26, pin 24 serving also to fix sleeve 25 to rod 26. Located between sleeve 25 and a fixed bearing 27 is a spring 28 which acts in a direction to force rod 26 toward the right as shown in Fig. 1. 29 is a second bearing for rod 26 which serves also as a stop to limit movement of shaft 26 toward the right.

The construction so far described is a known portion of a motor loom drive, and is to be taken as typical of any construction of this character. During normal operation rod 26 is moved toward the left so as to bring clutch surface 8 on gear wheel 4 into engagement with the clutch facing on clutch disk 10 and rod 26 is held in this position by certain portions of the loom mechanism, the arrangement as a whole, forming what is known as a "shipping mechanism" for a loom. In the present instance, a portion of a shipping mechanism is indicated, rod 26 being shown as provided with a hook 30 adapted to be engaged by a spring latch 31 carried by a part of the loom structure. Normally latch 31 is in engagement with hook 30 and holds the clutch in "in" position. On the occurrence of certain abnormal operating conditions, rod 26 is released, thereby permitting spring 28 to force lever 16 toward the right as shown in Fig. 1 so as to move gear wheel 4 away from clutch disk 10, thereby disconnecting the motor drive. In this connection, it will be understood that the motor armature floats in its field and is capable of sufficient axial movement to permit of engagement and disengagement of clutch surface 8 with the clutch facing of disk 10.

As pointed out above, it is very important that when the shipping mechanism operates, the motor drive be disconnected instantly from the loom so that the loom will be stopped at once. According to our invention, we accomplish this result by providing pinion 3 and gear wheel 4 with single helical teeth of a comparatively small angle, for example, an angle of the order of 10 or 15 degrees, the teeth extending in a direction such that the side thrust due to the single helical teeth is in a direction tending to move gear wheel 4 toward the right, as viewed in Fig. 1. In Fig. 1 the direction of rotation is indicated by the arrow.

With this arrangement, it will be seen that whenever the shipping mechanism is released spring 28 will be assisted in moving gear wheel 4 to open the clutch by the axial thrust due to the helical tooth drive. As a result gear wheel 4 will be moved very quickly to disconnect the motor from the driven shaft.

What we claim as new and desire to secure by Letters Patent of the United States is:

1. A construction comprising a gear wheel which forms the movable element of a clutch, a pinion meshing with the gear wheel, a motor for driving them, and means normally holding the gear wheel in clutch-engaging position, characterized by the fact that the gear wheel and pinion are provided with helical teeth and that the normal direction of rotation is such that the axial thrust due to the helical teeth is in a direction to tend to move the gear wheel in a direction to release the clutch.

2. In a loom structure, a gear wheel which forms a movable element of a clutch, a pinion meshing therewith, means for driving the pinion, and means normally holding said gear wheel in clutch-engaging position, said gear wheel and pinion being provided with teeth of an angle such that in the normal direction of rotation the axial thrust due to the teeth tends to move the gear wheel in a direction to release the clutch.

3. A loom drive comprising a gear wheel which forms a movable element of a clutch, a pinion meshing therewith, an electric motor for driving the pinion, and means normally holding said gear wheel in clutch-engaging position, said gear wheel and pinion being provided with single helical teeth of an angle such that in the normal direction of rotation the axial thrust due to the teeth tends to move the gear wheel in a direction to open the clutch.

4. In combination, a gear wheel which forms the movable element of a clutch, a pinion meshing with the gear wheel, means for driving the pinion, a spring means which tends to move the gear wheel in a direction to disengage the clutch, and means for holding the gear wheel in clutch-engaging position, said gear wheel and pinion being provided with single helical teeth of an angle such that in the normal direction of rotation the axial thrust due to the teeth tends to move the gear wheel in a direction to assist the spring in releasing the clutch.

5. The combination with two clutch members one of which is axially movable relatively to the other, of means for positively holding such clutch members in engagement with each other, and a gearing connected to the axially movable clutch member for rotating it, said gearing having helical teeth of an angle such that in the normal direction of rotation of the clutch members the axial thrust due to the teeth is in a direction tending to separate the clutch members.

6. The combination with two clutch members one of which is axially movable relatively to the other, of a spring which biases such movable clutch member toward open position, means for positively holding said clutch members in engagement with each other in opposition to said biasing means, and a gearing connected to the axially movable clutch member for rotating it, said gearing having helical teeth of an angle such that in the normal direction of rotation of the clutch members the axial thrust due to the teeth is in a direction tending to separate the clutch members.

In witness whereof, we have hereunto set our hands this sixth day of July, 1927.

IRA E. ROGERS.
WILLIAM C. SCOTT.